Feb. 19, 1952     R. V. KLINE     2,586,169
APPARATUS FOR CONTROLLING AND MEASURING
THE CONCENTRATION OF SOLUTIONS
Filed Aug. 4, 1947

INVENTOR
RAYMOND V. KLINE
BY Caswell & Lagaard
ATTORNEYS

Patented Feb. 19, 1952

2,586,169

UNITED STATES PATENT OFFICE 2,586,169

APPARATUS FOR CONTROLLING AND MEASURING THE CONCENTRATION OF SOLUTIONS

Raymond V. Kline, Minneapolis, Minn., assignor to Patent Management Inc., Minneapolis, Minn., a corporation of Minnesota Application August 4, 1947, Serial No. 765,867

1 Claim. (Cl. 175—183)

My invention relates to apparatus for controlling and measuring the concentration of solutions and has for an object to provide apparatus by means of which such results may be automatically procured.

An object of the invention resides in providing apparatus using electrical means for controlling and measuring the concentration of solutions.

A still further object of the invention resides in providing apparatus in which the concentration of the solution is determined by the measurement of the electrical resistance or of the impedance of the solution.

An object of the invention resides in providing apparatus in which variations in the resistance or impedance of the solution due to temperature changes is automatically compensated for.

A further object of the invention resides in providing a unit insertable into the solution whose concentration is to be measured or controlled, said unit having electrodes making electrical contact with the solution and a compensating resistor subject to the temperature of the solution.

Another object of the invention resides in causing separate currents to flow through said resistor and through said electrodes, at least the current through said electrodes being alternating current, in rectifying said current or currents, in combining currents corresponding to the currents flowing through said resistor and electrodes and in utilizing the resultant of said currents for the purpose of control and/or measurement.

A still further object of the invention resides in providing a loading device to which the circuits for said currents are connected and in connecting said circuits to said loading device in such a manner that the currents oppose one another.

An object of the invention resides in providing a meter operated by the resultant of the currents combined.

A still further object of the invention resides in providing a control device such as an electrically operated valve operable by the resultant of the currents combined.

Other objects of the invention reside in the novel combination and arrangement of parts and in the details of construction hereinafter illustrated and/or described.

Figure 1:
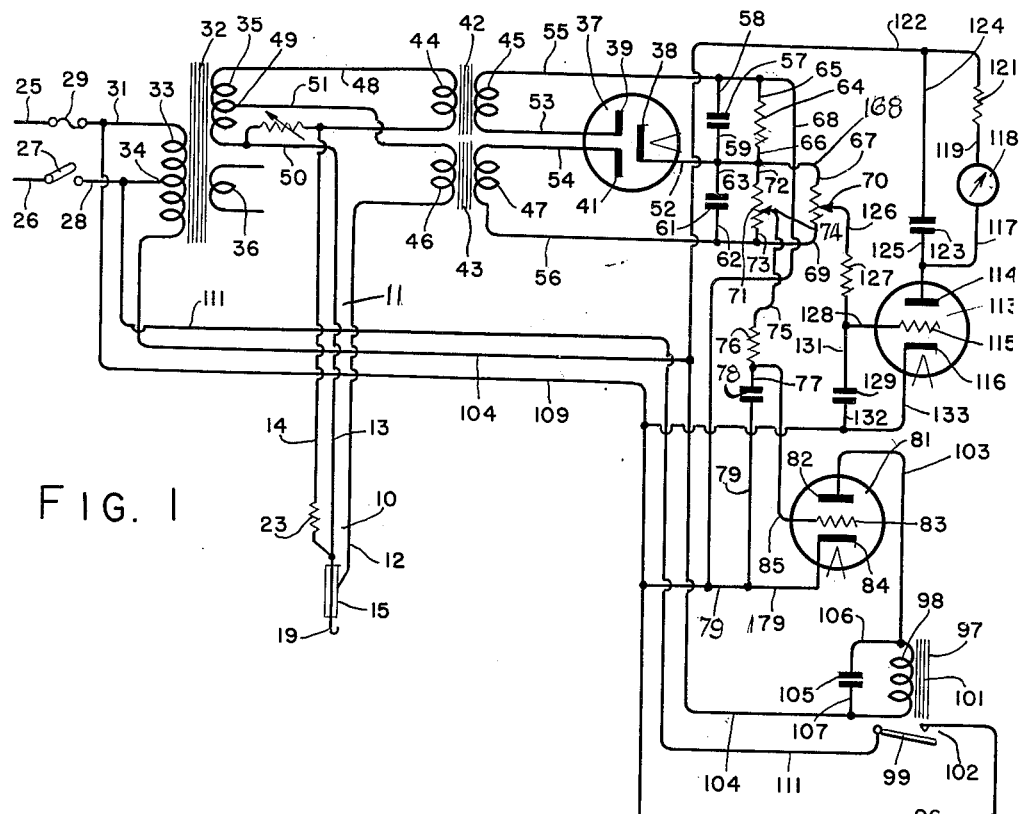
Fig. 1 is a wiring diagram of an apparatus for controlling the concentration of solutions and illustrating an embodiment of my invention.
Figure 2:
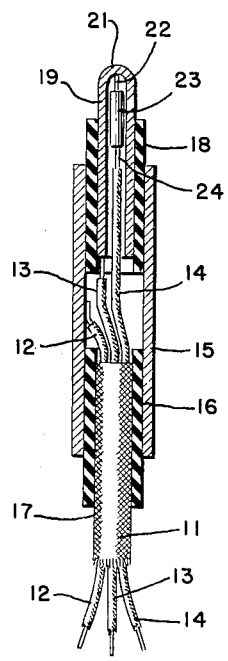
Fig. 2 is a longitudinal elevational sectional view of the control unit of the invention.

The invention includes a control unit 10 which is shown in detail in Fig. 2. This unit consists of a cable 11 having three conductors 12, 13, and 14. The unit proper includes a sleeve 15 constructed of metal which has disposed at one end of the same an insulating bushing 16. This bushing is pressed securely into the sleeve 15 and snugly fits about the outer covering 17 of the cable 11 forming a fluid tight connection between the same. At the other end of the sleeve 15 is provided another insulating bushing 18 which likewise is pressed into the sleeve 15 and protrudes outwardly therefrom. This bushing has mounted in it a tubule 19 which is pressed into the said bushing and forms a fluid tight connection therewith. The end 21 of the tubule 19 is closed and has attached to it one terminal 22 of a temperature compensating resistor 23. The composition of the resistor 23 is such that the resistance of said resistor varies with temperature in the same manner and to the same extent that the impedance of the solution at a certain concentration varies with temperature change. The other terminal 24 of this resistor is connected to the conductor 14 of cable 11. Conductor 13 is connected to the tubule 19 which forms one electrode of the control unit 10, while conductor 12 is connected to the sleeve 15 which forms the other electrode of said unit. Paralleling the resistor 23 is an adjustable resistor 50 which is connected at one end to the conductor 13 and at its other end to conductor 14.

Electrical power for operation of the invention is procured from a suitable source of alternating current which has connected to it two conductors 25 and 26. The conductor 26 is connected to a switch 27 which in turn is connected to another conductor 28. Conductor 25 is connected to a fuse 29 which in turn is connected to another conductor 31. Conductors 28 and 31 have connected to them other conductors 111 and 109 which will be subsequently referred to. The invention utilizes a transformer 32 which has a primary 33 provided with a tap 34. The said transformer also has two secondaries 35 and 36. One end of the primary 33 of transformer 32 is connected to the conductor 31 while the conductor 28 is connected to the tap 34 of the said primary.

The unit 10 is adapted to be inserted into the solution whose concentration is to be determined and the impedance of the liquid between the electrodes 19 and 15 compared with the resistance of the resistor 23. For this purpose a rectifier tube 37 is employed which has a cathode 38 and two plates 39 and 41. In conjunction with this tube two transformers 42 and 43 are employed. The transformer 42 has a primary 44 and a secondary 45 while the transformer 43 has a primary 46 and a secondary 47. The conductor 14 of cable 11 is directly connected to one end of the primary 44 of transformer 42. The other end of the primary 44 of this transformer is connected by means of a conductor 48 to one end of the secondary 35 of the transformer 32. The other end of this secondary is connected to the conductor 13. The secondary 35 of transformer 32 has a tap 49 which is connected by means of a conductor 51 with the one end of the primary 46 of transformer 43. The other end of said primary is connected to the conductor 12. Connected across the conductors 13 and 14 and in parallel with the resistor 23 is an adjustable resistor 50. This resistor is used to compensate for variations in the impedance across the electrodes 15 and 19. It will thus be seen that alternating current voltage is impressed across the resistor 23 and the portion of the solution between the electrodes 19 and 15 and that the current through this resistance and this impedance is separately stepped up by the two transformers 42 and 43 and separately rectified by the rectifier 37.

The cathode 38 of the tube 37 is connected to a conductor 52. The plates 39 and 41 of this tube are connected by means of conductors 53 and 54 to one side of each of the secondaries 45 and 47 of the transformers 42 and 43. The other sides of these secondaries have conductors 55 and 56 connected to them. A condenser 57 is connected by means of a conductor 58 to the conductor 55 and by means of a conductor 59 to the conductor 52. In a similar manner a condenser 61 is connected by means of a conductor 62 to the conductor 56 and by means of a conductor 63 to the conductor 52. Paralleling the condenser 57 is a resistor 64 which is connected by means of a conductor 65 with the conductor 55. The said resistor is further connected by means of a conductor 66 with a conductor 52. Paralleling the condenser 61 is a potentiometer 71 one end of which is connected by means of a conductor 72 to the conductor 52. The other end of the said potentiometer is connected by means of a conductor 73 to the conductor 56. The potentiometer 71 has a movable contact 74 which is connected by means of a conductor 75 to a resistor 76. This resistor is in turn connected by means of a conductor 77 to a condenser 78 which is connected by means of a conductor 79, to the conductor 109. A conductor 68 is connected to conductor 55 and to conductor 79.

The output of the rectifier 37 is fed to an amplifier tube 81 which has a plate 82, a grid 83 and a cathode 84. A conductor 85 is connected to the conductor 77 between the resistor 76 and the condenser 78 and also to the grid 83 of the tube 81. The cathode 84 of the said tube is connected by means of a conductor 179 with the conductor 79 and by means of the same to the conductor 109 previously referred to.

My invention is particularly useful in controlling the concentration of a solution and for this purpose an electrically operated valve 86 is employed. This valve comprises a valve body 87 having a valve seat 88 and a valve head 89 cooperating therewith. An inlet pipe 91 is connected to a source of a concentrated solution of the substance in solution while an outlet pipe 92 leads the same to the receptacle in which the concentration of the solution is being controlled. Valve head 89 has a valve stem 93 extending upwardly therefrom which is attached to the core 94 of a solenoid 95. This solenoid includes a winding 96 encircling the core 94 which is adapted to lift the valve head 89 when the said winding is energized. The solenoid 95 is operated by means of relay 97. This relay includes a winding 98 and an armature 99 adapted to be attracted by the core 101 of said relay when the winding 68 is energized. A contact 102 is adapted to be engaged by the armature 99 when the winding 98 is energized and to close a circuit through said contact and armature.

One end of the winding 98 of relay 101 is connected by means of a conductor 103 to the plate 82 of tube 81. The other end of this winding is connected by means of a conductor 104 to the primary 33 of transformer 32. A condenser 105 is connected across the conductors 103 and 104 by means of conductors 106 and 107. Winding 96 of solenoid 95 is connected by means of a conductor 108 to the contact 102. The other end of this winding is connected to the conductor 109 which as previously stated is connected to the conductor 31 leading from the source of power. The armature 99 of relay 95 is connected to the conductor 111 previously referred to.

In addition to actually controlling the concentration of the solution it is possible with my invention to accurately measure and indicate the concentration of the same. For this purpose a tube 113 is employed which is similar to the tube 81 and which has a plate 114, a grid 115, and a cathode 116. The plate 114 of this tube is connected by means of a conductor 117 to an electric meter 118. This meter may be a millivolt meter or similar suitable device. A conductor 119 is connected to the meter 118 and to a resistor 121. Resistor 121 is connected by means of a conductor 122 with the conductor 104 previously referred to. For calibrating the meter 118 a potentiometer 67 is employed which has a movable contact 70. This potentiometer is connected in parallel with the potentiometer 71. A conductor 168 connects one end of the said potentiometer to the conductor 52 which leads from the cathode of the tube 37. Another conductor 69 connects the other end of the potentiometer 67 to the conductor 56 leading from the secondary 47 of transformer 43. The movable contact 70 of the poteniometer 67 is connected by means of a conductor 126 to a resistor 127. This resistor is connected by means of a conductor 128 to the grid 115 of tube 113. A condenser 129 is connected by means of a conductor 131 to the conductor 28 and by means of another conductor 132 to a conductor 133. Conductor 133 in turn is connected to the cathode 116 and to the conductor 109.

Shunting the meter 118 and resistor 121 is a condenser 123. This condenser is connected by means of a conductor 124 to the conductor 122 and by means of a conductor 125 to the conductor 117.

A method of operation of the meter 118 is as follows: A portion of the current rectified by the rectifier 37 and being the resultant of the two currents produced thereby is impressed upon the potentiometer 67. This current is applied to the grid 115 of the tube 113 which in turn is amplified by the said tube and the output of the said tube is impressed upon the meter 118. The potentiometer 67 serves to calibrate the meter 118 and to cause the same to indicate the correct concentration of the solution.

While no wiring has been shown for energizing the filaments of the various tubes of the invention it can readily be comprehended that said tubes may be connected to suitable circuits energized from the winding 36 of the transformer 32.

For the purpose of indicating whether the valve 86 is open or closed a pilot lamp 134 is employed. This lamp is connected by means of conductors 135 and 136 to the conductors 108 and 109 and is in parallel with the winding 96 of the solenoid 95.

In the use of the invention the control unit 10 is inserted into the solution whose concentration is to be controlled and/or measured. Tubule 19 being of metal rapidly conducts the heat from the solution to or from the resistor 23 bringing said resistor at substantially the same temperature as that of the solution. Resistor 50 is used for adjusting the value of the resistance in the branch of the circuit containing resistor 23 so that the current passing through the said resistor when transformed and rectified just offsets the current produced in the unit through the electrodes 19 and 15. In this manner no energization of the relay 97 occurs and the valves 86 remain closed. After the solution has been used for a while the concentration of the same becomes less and the difference between the currents rectified by the tube 37 will place a load upon the tube 81 which will actuate relay 97 and cause the valve 86 to open. Concentrated solution now flows into the diluted solution until the impedance of the solution between the electrodes 15 and 19 causes the combined currents to again cancel out and cause de-energization of relay 97. If the temperature of the solution varies the resistance of the compensating resistor 23 varies approximately the same as the impedance of the solution between the electrodes 15 and 19. Thus, the same results are produced for the same concentration with variations in temperature and the apparatus operates in identically the same manner regardless of temperature. If the operator desires a different concentration the potentiometer 71 is adjusted and may be set to give the desired concentration. Since the tube 81 operates only when the voltage on the grid is substantially positive it will readily be comprehended that the relay 95 will never operate when the concentration exceeds that for which the device is set since increase in the concentration of the liquid merely makes the potential on the grid of said tube more negative. While the relay 97 is automatically procuring the desired concentration of the solution, the concentration of the solution is also indicated by the meter 118 so that the operator may readily determine visually the condition of the solution.

The advantages of the invention are manifest. The apparatus functions automatically to control the concentration of a solution and at the same time indicates by visual means the condition of the solution. The indicating meter if desired may be situated remotely from the apparatus so that a person not at the locality of the solution may at all times be advised of the condition of the solution. The apparatus is simple in construction and positive in action. The apparatus requires no particular skill of the operator and automatically maintains the concentration of the solution as desired. With my invention changes in the impedance of the solution as produced by temperature changes is compensated for so that no correction of readings of the meter need be made and so that the solution will automatically have the proper concentration regardless of temperature. With my invention the objection of electrolysis is entirely eliminated. The two currents used with the apparatus in the determining of the concentration is proper so that an ordinary relay may be readily operated from the resultant of the current combined.

Changes in the specific form of my invention, as herein described, may be made within the scope of what is claimed without departing from the spirit of my invention.

Having described my invention, what I claim as new and desire to protect by Letters Patent is:

Apparatus responsive to the electrical impedance of solutions variable upon change in concentration and upon change in temperature at any concentration, said apparatus comprising a pair of spaced electrodes making electrical contact with the solution, a compensating resistor disposed in the solution and subject to the temperature thereof, means for causing the flow of alternating current through said resistor and through said electrodes, transformers for separately stepping up said currents, rectifying means for separately rectifying the stepped up currents, circuits connected to said rectifier and through which the rectified currents flow, a loading device comprising two resistors, said resistors being connected in series and each being connected in one of said circuits, said circuits being arranged so that the currents through said resistors oppose one another and current responsive means energized by the current flowing through said resistors.

RAYMOND V. KLINE.

REFERENCES CITED

The following references are of record in the file of this patent:

UNITED STATES PATENTS

| Number | Name | Date |
|---|---|---|
| 1,399,181 | Bascom | Dec. 6, 1921 |
| 1,450,023 | Edelman | Mar. 27, 1923 |
| 1,701,331 | Merrill | Feb. 5, 1929 |
| 1,912,188 | Gann | May 30, 1933 |
| 2,269,152 | Hathaway | Jan. 6, 1942 |
| 2,330,394 | Stuart | Sept. 28, 1943 |
| 2,371,636 | McConnell | Mar. 20, 1945 |
| 2,372,056 | Broding | Mar. 20, 1945 |
| 2,450,459 | Thomson | Oct. 5, 1948 |